United States Patent
Wang

(10) Patent No.: US 12,050,615 B2
(45) Date of Patent: Jul. 30, 2024

(54) PRESENTATION METHOD, APPARATUS AND ELECTRONIC DEVICE

(71) Applicant: Beijing Zitiao Network Technology Co., Ltd., Beijing (CN)

(72) Inventor: Zhenjia Wang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/491,541

(22) Filed: Oct. 20, 2023

(65) Prior Publication Data

US 2024/0045879 A1 Feb. 8, 2024

Related U.S. Application Data

(63) Continuation of application No. PCT/CN2022/091081, filed on May 6, 2022.

(30) Foreign Application Priority Data

May 6, 2021 (CN) .......................... 202110493071.X

(51) Int. Cl.
G06F 16/248 (2019.01)
(52) U.S. Cl.
CPC .................. G06F 16/248 (2019.01)
(58) Field of Classification Search
CPC ........................ G06F 16/248; G06F 16/2282
See application file for complete search history.

(56) References Cited

U.S. PATENT DOCUMENTS

| | | | |
|---|---|---|---|
| 6,292,810 B1 * | 9/2001 | Richards | G06F 40/18 715/810 |
| 6,976,226 B1 * | 12/2005 | Strong | G06F 16/9577 715/788 |
| 7,526,719 B1 * | 4/2009 | Gopalakrishnan | G06F 16/26 715/227 |
| 8,078,955 B1 | 12/2011 | Gupta | |

(Continued)

FOREIGN PATENT DOCUMENTS

| | | |
|---|---|---|
| CN | 109829141 A | 5/2019 |
| CN | 109829144 A | 5/2019 |

(Continued)

OTHER PUBLICATIONS

International Search Report in PCT/CN2022/091081, mailed Aug. 2, 2022, 3 pages.

(Continued)

*Primary Examiner* — Jorge A Casanova
(74) *Attorney, Agent, or Firm* — Astute IP Law Group

(57) ABSTRACT

Embodiments of the present disclosure discloses a presentation method, apparatus, and electronic device. A specific embodiment of the presentation method comprises in response to a hit of a data unit in a first data table to a target field in a second data table, determining whether a format reference condition is met; in response to determining that a format reference condition is met, determining a target field data item that matches the data unit; presenting the matched target field data item in the data unit of the first data table in a format style of the matched target field data item in the target field.

15 Claims, 6 Drawing Sheets

(56) References Cited

U.S. PATENT DOCUMENTS

| | | | |
|---|---|---|---|
| 11,874,843 B1* | 1/2024 | Smith | G06F 3/0482 |
| 11,915,195 B2* | 2/2024 | Tatituri | G06Q 10/0838 |
| 2002/0101450 A1* | 8/2002 | Magendanz | G06F 9/451 |
| | | | 715/764 |
| 2004/0103366 A1* | 5/2004 | Peyton-Jones | G06F 40/18 |
| | | | 715/213 |
| 2005/0228711 A1* | 10/2005 | Lahey | G06Q 10/063114 |
| | | | 705/7.26 |
| 2007/0050699 A1* | 3/2007 | Simkhay | G06F 40/177 |
| | | | 715/248 |
| 2008/0154769 A1* | 6/2008 | Anderson | G06Q 40/06 |
| | | | 705/40 |
| 2011/0122138 A1* | 5/2011 | Schmidt | G06F 18/40 |
| | | | 382/128 |
| 2013/0230104 A1 | 9/2013 | Song et al. | |
| 2013/0339832 A1* | 12/2013 | Simkhay | G06F 40/177 |
| | | | 715/217 |
| 2014/0372854 A1* | 12/2014 | Otero | G06F 40/18 |
| | | | 715/219 |
| 2015/0095312 A1* | 4/2015 | Gulwani | G06F 16/284 |
| | | | 707/722 |
| 2017/0147551 A1* | 5/2017 | Kalisz | G06F 16/283 |
| 2017/0199861 A1* | 7/2017 | Zia | G06F 3/04842 |
| 2018/0157468 A1* | 6/2018 | Stachura | G06F 8/34 |
| 2018/0376149 A1 | 12/2018 | Zhang et al. | |
| 2019/0114302 A1* | 4/2019 | Bequet | G06N 3/084 |
| 2019/0146998 A1* | 5/2019 | Jin | G06F 9/4881 |
| | | | 718/104 |
| 2019/0171748 A1* | 6/2019 | Duffield | G06F 16/245 |
| 2020/0404302 A1 | 12/2020 | Heo | |
| 2020/0413071 A1 | 12/2020 | Huang et al. | |
| 2021/0081405 A1* | 3/2021 | Zarras | G06F 16/2379 |
| 2022/0366129 A1* | 11/2022 | Dong | G06F 40/137 |

FOREIGN PATENT DOCUMENTS

| | | |
|---|---|---|
| CN | 112347747 A | 2/2021 |
| CN | 112913247 A | 6/2021 |
| CN | 113220752 A | 8/2021 |
| EP | 3691264 A | 8/2020 |
| WO | 2020156464 A1 | 8/2020 |
| WO | 2020243295 A1 | 12/2020 |
| WO | 2020259426 A1 | 12/2020 |
| WO | 2021049894 A1 | 3/2021 |

OTHER PUBLICATIONS

International Search Report in PCT/CN2022/085554, mailed Sep. 27, 2022, 4 pages.

International Search Report in PCT/CN2022/102956, mailed Sep. 26, 2022, 4 pages.

Xu et al., "CE8-related: Combination test of JVET-N0176/JVET-N0317/JVET-N0382 on simplification of IBC vector prediction," Joint Video Experts Team (JVET) of ITU-T SG 16 WP 3 and ISO-IEC JTC 1/SC 29/WG 11, 14th Meeting: Geneva, CH, Mar. 19-27, 2019, JVET-N0843-v1, 11 pages.

Qianhuahua Hua, Method for Formatted References in Excel, https://zhidao.baidu.com/question/195401149.html, Jan. 7, 2016, 3 pages.

Office Action and Search Report in CN202110493071.X issued Aug. 31, 2022, 6 pages.

* cited by examiner

| ORDER NAME | ARTICLE TYPE | ORDER VALUE |
|---|---|---|
| ORDER A | FOOTBALL | 100 |
| ORDER B | FOOTBALL, BASKETBALL | 100, 200 |

Fig.2A

| ARTICLE TYPE | SINGLE ARTICLE VALUE |
|---|---|
| FOOTBALL | 100 |
| BASKETBALL | 200 |

Fig.2B

PRESENTATION METHOD, APPARATUS AND ELECTRONIC DEVICE

CROSS-REFERENCE TO RELATED APPLICATIONS

This application is a continuation of International Patent Application No. PCT/CN2022/091081, filed on May 6, 2022, which claims the benefit of CN Patent Application No. 202110493071.X filed on May 6, 2021, both of which are incorporated herein by reference.

FIELD

The present disclosure relates to internet technology, in particular to a presentation method, apparatus, and electronic device.

BACKGROUND

With the development of the Internet, more and more users browse various types of information using terminal devices. For example, by using the terminal devices, users may open online collaboration tables, on which various types of data may be presented.

SUMMARY

Summary of the present disclosure is provided to briefly introduce the concepts, which will be further described in detail in Detailed Descriptions. The Summary of the present disclosure is not intended to identify key or essential features of the claimed technical solution. The Summary of the present disclosure is not to limit the scope of the claimed technical solution.

In a first aspect, there is provided a presentation method. The presentation method comprises in response to a hit of a data unit in a first data table to a target field in a second data table, determining whether a format reference condition is met; in response to determining that a format reference condition is met, determining a target field data item that matches the data unit; presenting the matched target field data item in the data unit of the first data table in a format style of the matched target field data item in the target field.

In a second aspect, there is provided a presentation apparatus. The presentation apparatus comprises a first determination unit for, in response to a hit of a data unit in a first data table to a target field in a second data table, determining whether a format reference condition is met; a second determination unit for, in response to determining that a format reference condition is met, determining a target field data item that matches the data unit; a presentation unit for presenting the matched target field data item in the data unit of the first data table in a format style of the matched target field data item in the target field.

In a third aspect, there is provided an electronic device. The electronic device comprising one or more processors; and a storage apparatus storing one or more programs. The one or more programs, when executed by the one or more processors, cause the one or more processors to perform the presentation method of the first aspect.

In a fourth aspect, there is provided a computer-readable medium storing computer program thereon. The program, when executed by a processor, carries out steps of the presentation method of the first aspect.

The presentation method, apparatus, and an electronic device proposed in the embodiments of the present disclosure, by determining whether a format reference condition is met if a hit of a data unit in a first data table to a target field in a second data table, if so, determining, in the data item of the target field, the data item content of the data item in the function field, then when presenting the data item content in the data unit, presenting it in the format style of the data item content in the target field. Therefore, in a scenario of a cross table reference, data can be presented in the reference data table with the style of that in the original data table, which achieves the reference results in a style of "what you see is what you get", and meanwhile improve the richness of the information types presented in the reference table, and improve the efficiency of users in obtaining information from the data presented in the referenced data table.

BRIEF DESCRIPTION OF DRAWINGS

The above and other features, advantages and aspects of embodiments of the present disclosure will become more apparent in combination with the drawings and with reference to the following detailed description. In the drawings, the same or similar reference numerals denote the same or similar elements. It is to be understood that the drawings are only for the purpose of illustrations, elements and components in the drawings are not presented in scale.

FIG. 2A and FIG. 2B illustrate schematic diagrams of an application scenario of a presentation method according to the present disclosure;

DETAILED DESCRIPTIONS

Figure 1:
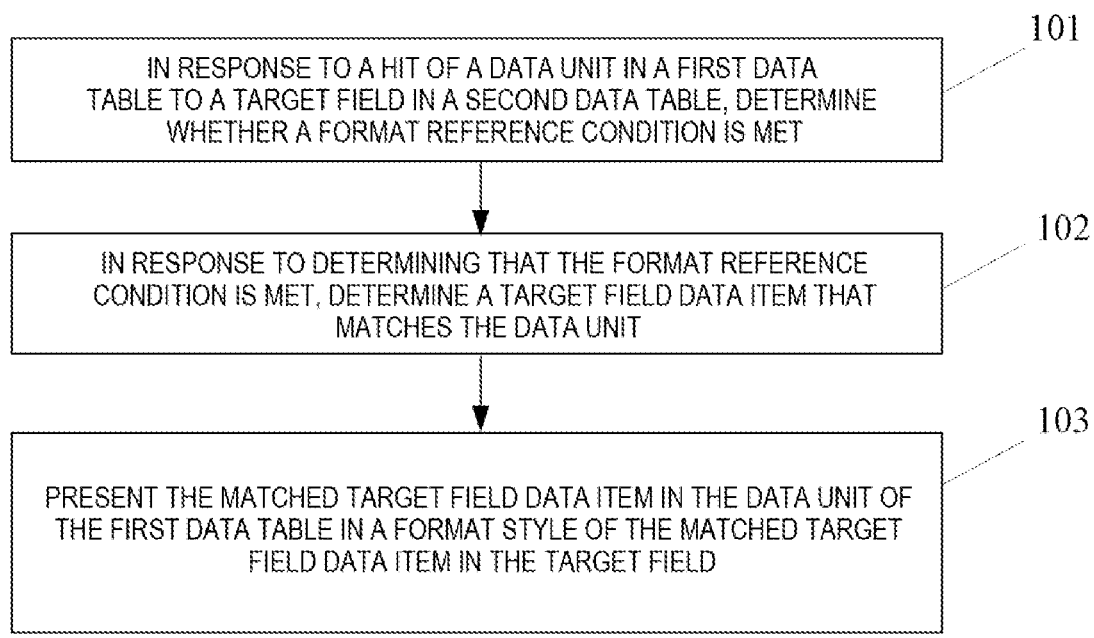
FIG. 1 illustrates a flowchart of an embodiment of a presentation method according to the present disclosure.

Embodiments of the present disclosure will be described in more detail below with reference to the accompanying drawings. Although some embodiments of the present disclosure are shown in the drawings, it is to be understood that the present disclosure can be realized in various forms and should not be interpreted as being limited to the embodiments set forth herein. On the contrary, these embodiments are provided for a more thorough and complete understanding of the present disclosure. It is to be understood that the drawings and embodiments of the present disclosure are only for illustrative purposes and are not intended to limit the scope of protection of the present disclosure. It is to be understood that steps recited in the method implementation of the present disclosure may be performed in different order and/or in parallel. Further, the method implementation may include additional step(s) and/or omit performing step(s) as shown. The scope of the present disclosure is not limited in this regard.

In the description of embodiments of the present disclosure, the term "comprise(s)" and similar terms shall be understood as open inclusion, that is, "including but not limited to". The term "based on" is to be understood as "based at least in part on". The term "one embodiment" is to be understood as "at least one embodiment"; the term "another embodiment" is to be understood as "at least one another embodiment". The term "some embodiments" is to be understood as "at least some embodiments". Other explicit and implicit definitions may also be comprised below.

In the description of embodiments of the present disclosure, the term "comprise(s)" and similar terms shall be understood as open inclusion, that is, "including but not limited to". The term "based on" is to be understood as "based at least in part on". The term "one embodiment" or "the embodiment" is to be understood as "at least one embodiment". The term "some embodiments" is to be understood as "at least some embodiments". Other explicit and implicit definitions may also be comprised below.

It is to be noted that the concepts "first", "second" and the like used herein are only used to distinguish different apparatuses, modules or units, and they do not limit the order or the interdependence of functions performed by these apparatuses, modules or units.

It is to be noted that the expression "one" and "multiple" used herein are only for the purpose of illustrations rather than limitations, and those skilled in the art would understand that they is to be understood as "one or more" unless otherwise clearly indicated in the context.

Names of messages or information exchanged between multiple apparatuses in the embodiment of the present disclosure are only for the purpose of illustrations and are not for the purpose of limiting the scope of these messages or information.

Reference is now made to FIG. 1, which illustrates a flowchart of an embodiment of a presentation method according to the present disclosure. The presentation method may be applied at a terminal device. As shown in FIG. 1, the presentation method comprises the following steps.

Step 101, in response to a hit of a data unit in a first data table to a target field in a second data table, determining whether a format reference condition is met.

In this embodiment, the data table can be a table of multiple dimensions. In general, as an example, each row of the above table is called a record, and each column is called a field. A data format of each column of fields is fixed to ensure that the input data is standardized and orderly. The above table can provide various field types to meet the requirements of inserting various information in the above table.

In some embodiments of the present disclosure, the first data table and the second data table are sub-tables in a same table; or the first data table and the second data table are different tables respectively. Alternatively, the first data table and the second data table are sub-tables in different tables, respectively.

As an example, different field types may be chosen to be added according to different requirements. Field types may include but are not limited to at least one of the following: multiline text, single choice, multiple choice, person, date, attachment, number, check box, formula, association, etc.

In this embodiment, the data unit in the first data table, which in some scenarios can also be called as a cell, can be any data unit in the first data table. A field to which the data unit belongs may be any type of field.

In some application scenarios, the data unit may belong to a function field. A function field, which may also be called as a formula field, may be a field whose value is obtained by processing the data that has been input to the data table in a way of formula specifying. In other words, the value of a function field may be generated by related calculations based on the information that has been input without specifying by the user.

In this application, a data table or a field identified by "first" and "second" is for the purpose of explanation and but does not for the limitation of the data table or field. For example, the position of the first pair of fields in the first field in the data table would not be restricted.

In this embodiment, the target field in the second data table may be a field of any of field types. For example, the target field may be a field of any of field types among multiline text, single choice, multiple choice, person, date, attachment, number, check box, formula, association, etc.

In this embodiment, a hit of the data unit to the target field may include taking the target field as the calculation object to determine the data item value in the data unit. That is, the data unit refers to the target field data item in the target field. As an example, the reference is made to FIG. 2A, which shows the order information table, and FIG. 2B, which shows the article information table. For the cross-table query scenario, any item in the order value field in the order information table may be understood as a data unit; a single article value field in the article information table may be understood as the target field.

In this embodiment, the format reference condition may be used to indicate a condition for triggering a presentation in an original format style. The presentation in the original format style may be understood to mean that when the data of the second data table is presented in the first data table, the data is presented in the first data table in a format style with which the data is presented in the second data table.

In this embodiment, specific content of the above format reference conditions can be set according to the actual application scenario, which is not limited here.

In some application scenarios, the above format reference conditions can be set in various ways, for example, which may be input by the user through the condition selection control or may be carried out by setting parameter(s) in the function.

Step 102, in response to determining that a format reference condition is met, determining a target field data item that matches the data unit.

As an example, the reference is made to FIG. 2A, for the first item of the order value field in the order A record, a matched single item value field data item can be determined in the single item value field of the article information table shown in FIG. 2B, such as the "100" corresponding to a football.

Step 103, presenting the matched target field data item in the data unit of the first data table in a format style of the matched target field data item in the target field to which the matched target field data belongs.

As an example, the matched target field data can be a single value field data item belonging to the same record as the football in the item information table, that is, "100" (italic and underlined). A single value field data items belonging to the same record as football may be presented in the data unit in the format style of the single value field data items belonging to the same record as football in the item information table, such as "100" (italic and underlined).

The reference is made to the first item of the order value field belonging to the same record as the order A in FIG. 2.

In this embodiment, the format style may indicate the attributes of field data items, and the attribute(s) indicated by the format style may include but are not limited to at least one of the following: field type data and field display attribute. The field type attribute indicates the type of the field. The field display attribute may include field display parameters, which may include but not limited to at least one of the following: size, color, border, etc.

It is to be noted that according to the presentation method proposed in this embodiment, by determining whether a format reference condition is met if a hit of a data unit in a first data table to a target field in a second data table, if so, determining, in the data item of the target field, the data item content of the data item in the function field, then when presenting the data item content in the data unit, presenting it in the format style of the data item content in the target field. Therefore, in a scenario of a cross table reference, data can be presented in the reference data table with the style of that in the original data table, which achieves the reference results in a style of "what you see is what you get", and meanwhile improve the richness of the information types presented in the reference table, and improve the efficiency of users in obtaining information from the data presented in the referenced data table.

Specifically, presenting various types of fields in the original data table with an original field type and presentation pattern in the reference data table can realize the reference of various types of fields in the reference data table, so as to provide the consistency between the presented data items and the original data table, thus improving the accuracy of the information obtained by the user.

Specifically, in general, the user is familiar with the presentation style of the original data table, and if the presentation is based on the presentation style of the original data table, the user may reduce the cognitive impairment caused by the style and quickly obtain the meaning of the data item itself.

In some embodiments, the method may also comprise presenting a reference pattern input control; if an as-is reference instruction input at the reference pattern input control is received, determining that the format reference condition is met.

Figure 3:
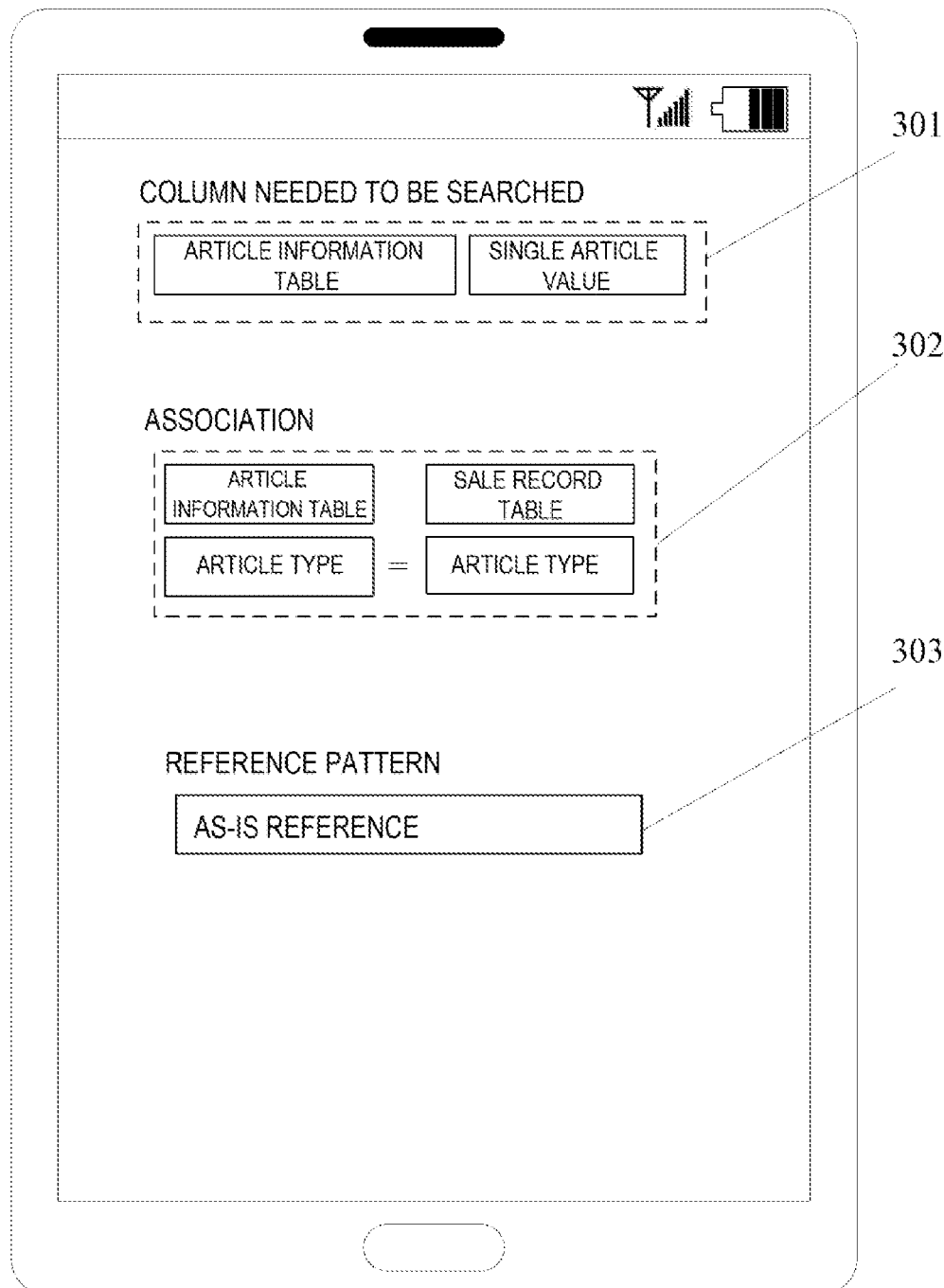
FIG. 3 illustrates a schematic diagram of another application scenario of a presentation method according to the present disclosure.

The reference is made to FIG. 3, which illustrates an exemplary scenario of cross table reference. The target field can be set in the target field setting area 301 in FIG. 3. For example, the target field can be a single item value field in the article information table. The association pattern may be set in the association setting area 302 shown in FIG. 3. For example, the association may be set between the article type field in the article information table and the article type field in the order information table. The specific reference pattern may be set in the reference pattern input control 303 in FIG. 3, for example, an as-is reference may be set.

Here, the reference pattern input control may carry out information input by various ways, for example, by selection, keyboard input, etc.

It is to be noted that a way to choose the presentation may be provided to the used by the presentation of the reference input control, to realize a flexibly selection of the reference pattern by the user according to the current application scenario.

In some embodiments, the method further comprises presenting a target field selection control, and determining a target field based on the target field selection control; presenting an associated field setting control, and establishing an association relationship between fields based on an operation of the associated field setting control.

Here, the first selection control is used to receive the target field identifier. As an example, refer to the target field setting area 301 in FIG. 3, which shows the target field selection control.

Here, the associated field setting control is used to receive a first field identifier and a second field identifier, the first field identifier indicates a field in a first data table, and the second field identifier indicates a field in a second data table. As an example, refer to the association setting area 302 in FIG. 3, which shows the associated field setting control.

It is to be noted that by presenting the target field selection control and the associated field setting control, the user can easily and quickly complete the cross-table reference setting, so that the machine can realize automatic reference according to the cross-table reference setting and improve the speed and accuracy of cross-table reference.

In some embodiments, the step 102 described above may include the process shown in FIG. 4. The process shown in FIG. 4 may include steps 401, 402, 403, and 404.

Step 401, obtaining a first field data item from a record to which a data unit belongs.

Here, there is a pre-established association between a first field of a first data table and a second field of a second data table. As an example, the association between the first and the second fields may be set in the way shown in FIG. 3.

As an example, the reference is made to FIGS. 2A and 2B. The order value in FIG. 2A can be understood as a data unit, and for the data items in the data unit, such as the data unit corresponding to order A (which can be called as the first item of the order value field), the process shown in FIG. 4 can be performed.

As an example, the first field data item may be obtained, such as the first item (football) of the article type data item, from a record to which the first item of the order value field (for example, the row at which the order A exists) belongs.

Step 402, searching, in the second field of the second data table, a second field data item that matches the obtained first field data item.

As an example, the second field data item that matches the first item (football) of the article type data item in the order information table may be searched in the article type field of the article information table, such as the first item (football) of the article type field of the article information table.

Step 403, obtaining a target field data item from a record to which the searched second field data item belongs.

As an example, the data item of the single item value field (the first item of the single item value field) is obtained as the target field data item from a record (i.e., the row) to which the first item (football) of the article type field of the article information table belongs.

Step 404, determining the obtained target field data item as a target field data item that matches the data unit.

As an example, the first item of a single item value field is determined as the data item value of the first item of the order value field.

Figure 4:
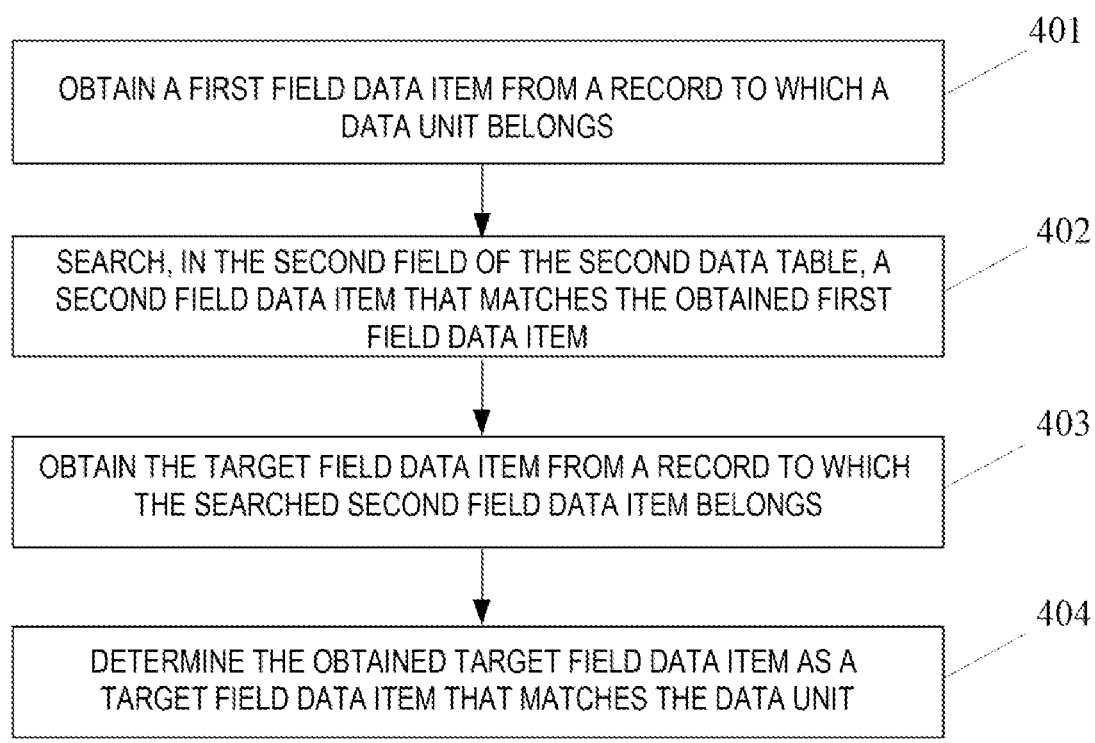
FIG. 4 illustrates a flowchart of an exemplary implementation of a presentation method according to the present disclosure.

It is to be noted that based on the process shown in FIG. 4, the target field can be automatically searched and referenced, to achieve an automatic presentation of the matched data item value in the data unit, so that the labor cost of manual matching is reduced, and the accuracy of the referenced result can be improved through automatic matching.

Figure 5:
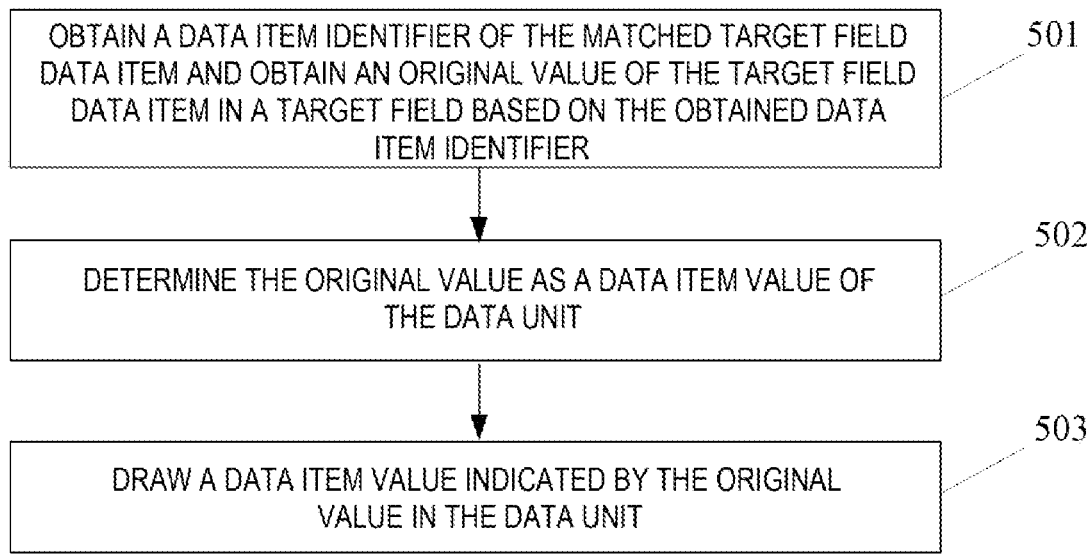
FIG. 5 illustrates a flowchart of an exemplary implementation of a presentation method according to the present disclosure.

In some embodiments, the step 103 may include the process shown in FIG. 5. The process shown in FIG. 5 may include steps 501, 502, and 503.

Step 501, obtaining a data item identifier of the matched target field data item, and obtaining an original value of the target field data item in a target field based on the obtained data item identifier.

As an example, the first item of a single article value field of the article information table can be the matched target field data item. The original value of the first item of a single article value field in a single article value field can be obtained based on an identifier (for example, data item ID) of the first item of a single article value field. Here, the original value may include, but is not limited to, at least one of the following: a type parameter, a presentation parameter.

Step 502, determining the original value as a data item value of the data unit.

As an example, the obtained original value can be determined as the data item value of the first item in the order value field.

Step 503, drawing a data item value indicated by the original value in the data unit.

As an example, the data item value indicated by the original value may be drew in the order value field of the order information table.

It is to be noted that obtaining the original value of the data item through the data item identifier of the target field data item and with the original value of the data item as drawing basis, a drawing in the data unit to present the style of the data item in the target field can be achieved, and the accuracy of the drawing with the original format style can be guaranteed.

In some embodiments, the method may further comprise in response to determining that a format reference condition is met, storing the target field as an instance corresponding to a third field; presenting, based on the instance, the third field and/or a derived field of the third field.

Here, the third field is a field to which the data unit in the first data table belongs. The third field may be a field of any of field types. In some application scenarios, the third field as mentioned above can be a function field.

Here, storing the target field as an instance corresponding to a third field may include reading and storing the data item of the target field from the second data table.

Here, the derived field of the third field may include a field obtained on the basis of the third field. The derivation pattern of the derived field may be set according to the actual application scenario, which it is not limited here.

As an example, the derivation pattern of the derived field may include at least one of the following but is not limited to: filtering data from a third field and merging data items in the third field with other field(s).

It is to be noted that a further calculation or presentation of the third field by taking the instance as the object can reduce the number of reading times of the data in the second data table due to the third field or the derived field and improve the calculation and presentation speed. Moreover, the derived fields of the third field may also be presented in the format style of the data items in the second data table, which improves the consistency of the presentation effect of the third field and the derived field.

In some embodiments, the step of the presenting, based on the instance, the third field and/or a derived field of the third field may comprise receiving a filtering instruction; if a field targeted by the filtering instruction is the third field, determining a filtering result from an instance corresponding to the third field; presenting the filtering result in a format style of a field in the instance.

Here, the filtering instruction may indicate that filtering the data item in the field that meets a preset condition.

As an example, the reference is made to FIG. 2A. For the order value field, the filter condition is set as the total amount not exceeding 100, and the filter result is the record of the order A. In this case, the order value corresponding to order A may be presented in the format style in the instance or in the second data table.

It is to be noted that by setting the instance corresponding to the third field, a human-computer interaction can be performed based on the third field, which can improve the calculation speed and presentation speed of responding to user operations and ensure the consistency of presentation results before and after filtering.

In some embodiments, the step of the presenting, based on the instance, the third field and/or a derived field of the third field may comprise receiving a drawing instruction; if a field targeted by the drawing instruction is the third field, obtaining data item value from an instance corresponding to the third field; drawing in a format style of a field in the instance.

As an example, if user A sets the third and target fields to generate an order information table, then user B with permission can also open the order information table. When user B opens the order information table, in response to the drawing instruction for the order value field, they can obtain the instance corresponding to the order value field and then draw it in the format style of the order value field.

It is to be noted that setting the instance corresponding to the third field can improve the speed of drawing the third field and ensure the consistency of the drawing results among different users.

In some embodiments, the target field is marked, for example, with a preset identifier.

In some embodiments, the step of the presenting, based on the instance, the third field and/or a derived field of the third field may comprise receiving a predefined function calculation instruction; generating a calculation result based on a function calculation instruction; if a field participating in generating the calculation result is marked with a preset identifier, and a calculation result includes an original value of a field marked with a preset identifier, presenting an original value in the calculation result in a format style of a field in the instance.

As an example, the reference is made to FIG. 2A. If a basketball is obtained through you a filtering in the article types, the order value field needs to ne changed accordingly. In the function calculation for filtering article types, the order value field needs to provide the original value (i.e., 200 corresponding to the basketball). If the order value field is marked with a preset identifier, there is an instance corresponding to the order value field. In this case, the original value in the calculated result can be presented in the format style of the instance in the order value field.

It is to be noted that whether the calculation result to be presented needs to be presented in the format style of the instance can be accurately determined by verifying the original value in the calculation result and fields involved in the calculation after the calculation result is generated. Thus, the consistency of the presentation effect can be achieved.

Figure 6:
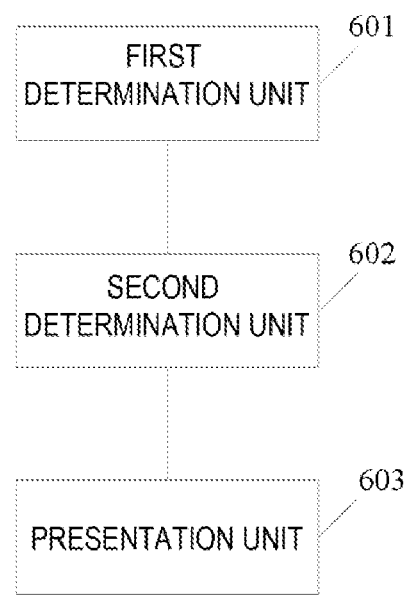
FIG. 6 illustrates a schematic structure diagram of an embodiment of a presentation apparatus according to the present disclosure.

The reference now is made to FIG. 6, as an implementation of the methods shown in the above drawings, which illustrates an embodiment of a presentation apparatus according to the present disclosure. The embodiment of the apparatus corresponds to the embodiment of the method as shown in FIG. 1. The presentation apparatus may be carried out various electronic devices.

As shown in FIG. 6, the present embodiment of the presentation apparatus comprises a first determination unit 601, a second determination unit 602 and a presentation unit

603. The first determination unit is for, in response to a hit of a data unit in a first data table to a target field in a second data table, determining whether a format reference condition is met. The second determination unit is for, in response to determining that a format reference condition is met, determining a target field data item that matches the data unit. The presentation unit is for presenting the matched target field data item in the data unit of the first data table in a format style of the matched target field data item in the target field.

In this embodiment, the specific processing and the technical effects of the first determination unit 601, the second determination unit and the presentation unit 603 of the presentation device may be with reference to the related descriptions of steps 101, 102 and 103 in the corresponding embodiments in FIG. 1, respectively, and will not be repeated here.

In some embodiments, the apparatus is further used to: presenting a reference pattern input control; if an as-is reference instruction input at the reference pattern input control is received, determining that the format reference condition is met.

In some embodiments, the apparatus is further used to: presenting a reference pattern input control; if an as-is reference instruction input at the reference pattern input control is received, determining that the format reference condition is met.

In some embodiments, the apparatus is further used to: presenting a target field selection control, and determining a target field based on the target field selection control, wherein the first selection control is used to receive the target field identifier; presenting an associated field setting control, and establishing an association relationship between fields based on an operation of the associated field setting control, wherein the associated field setting control is used to receive a first field identifier and a second field identifier, the first field identifier indicates a field in a first data table, and the second field identifier indicates a field in a second data table.

In some embodiments, in response to determining that the format reference condition is met, the determining a target field data item that matches the data unit comprises: obtaining a first field data item from a record to which a data unit belongs, wherein there is a pre-established association between a first field of a first data table and a second field of a second data table; searching, in the second field of the second data table, a second field data item that matches the obtained first field data item; obtaining a target field data item from a record to which the searched second field data item belongs; determining the obtained target field data item as a target field data item that matches the data unit.

In some embodiments, the presenting the matched target field data item in the data unit of the first data table in a format style of the matched target field data item in the target field comprises: obtaining a data item identifier of the matched target field data item, and obtaining an original value of the target field data item in a target field based on the obtained data item identifier; determining the original value as a data item value of the data unit; drawing a data item value indicated by the original value.

In some embodiments, the apparatus is further used to: in response to determining that a format reference condition is met, storing the target field as an instance corresponding to a third field, wherein the third field is a field to which the data unit in the first data table belongs; presenting, based on the instance, the third field and/or a derived field of the third field.

In some embodiments, the presenting, based on the instance, the third field and/or a derived field of the third field comprises: receiving a filtering instruction; if a field targeted by the filtering instruction is the third field, determining a filtering result from an instance corresponding to the third field; presenting the filtering result in a format style of a field in the instance.

In some embodiments, the presenting, based on the instance, the third field and/or a derived field of the third field comprises: receiving a drawing instruction; if a field targeted by the drawing instruction is the third field, obtaining data item value from an instance corresponding to the third field; drawing in a format style of a field in the instance.

In some embodiments, the target field is marked with a preset identifier; and the presenting, based on the instance, the third field and/or a derived field of the third field comprises: receiving a predefined function calculation instruction; generating a calculation result based on a function calculation instruction; if a field participating in generating a calculation result is marked with a preset identifier, and a calculation result includes an original value of a field marked with a preset identifier, presenting an original value in the calculation result in a format style of a field in the instance.

Figure 7:
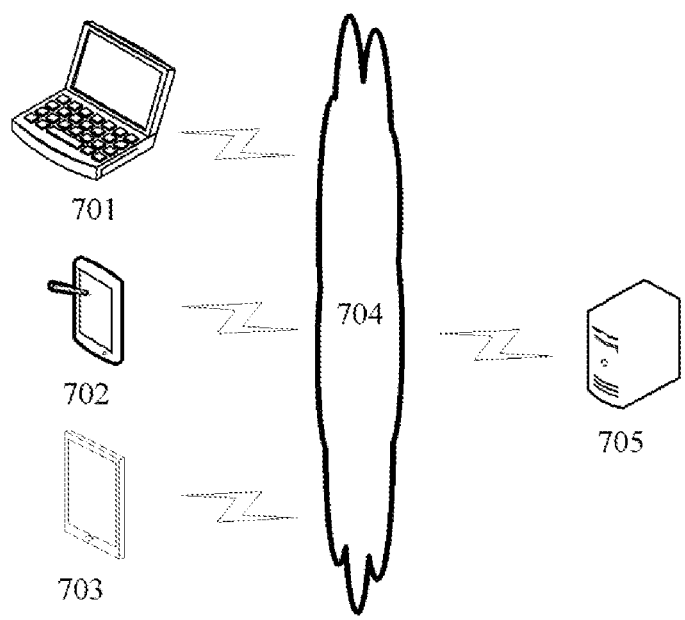
FIG. 7 illustrates an exemplary system architecture on which an embodiment of a presentation method according to the present disclosure can be applied.

The reference now is made to FIG. 7, which illustrates an exemplary system architecture on which an embodiment of a presentation method according to the present disclosure can be applied.

As shown in FIG. 7, the system architecture can include terminal devices 701, 702, 703, network 704, and server 705. Network 704 is a medium used to provide communication links between terminal devices 701, 702, 703, and server 705. Network 704 can include various connection types, such as wired, wireless communication links, or fiber optic cables.

Terminal devices 701, 702, and 703 can interact with server 705 through network 704 to receive or send messages, etc. Various client applications can be installed on terminal devices 701, 702, and 703, such as web browser applications, search applications, and news and information applications. The client applications in terminal devices 701, 702, and 703 can receive user instructions and complete corresponding functions according to the user's instructions, such as adding corresponding information to the information according to the user's instructions.

Terminal devices 701, 702, and 703 can be hardware or software. When terminal devices 701, 702, and 703 are hardware, they can be various electronic devices with display screens and support web browsing, including but not limited to smartphones, tablets, e-book readers, MP3 players (Moving Picture Experts Group Audio Layer III), MP4 players (Moving Picture Experts Group Audio Layer IV), laptops and desktop computers, and more. When terminal devices 701, 702, and 703 are software, they can be installed in the electronic devices listed above. It can be implemented as multiple software or software modules (such as software or software modules used to provide distributed services), or as a single software or software module, which is not limited here.

Server 705 can be a server that provides various services, such as receiving information obtaining request sent by terminal devices 701, 702, and 703, and obtaining presentation information corresponding to the information obtaining request in various ways according to the information request and sending the relevant data of the presentation information to the terminal devices 701, 702, 703.

It is to be noted that the presentation method provided in the present embodiment may be executed by the terminal equipment, and accordingly the presentation apparatus may be arranged in the terminal equipment 701, 702, 703. In addition, the presentation method provided by the present disclosure embodiment may also be executed by the server 705, and accordingly, the presentation apparatus may be arranged in the server 705.

It is to be understood that the number of terminal devices, networks, and servers shown in FIG. 7 is only for the propose of illustration. Depending on the implementation, any number of terminals, networks, and servers may be included.

Figure 8:
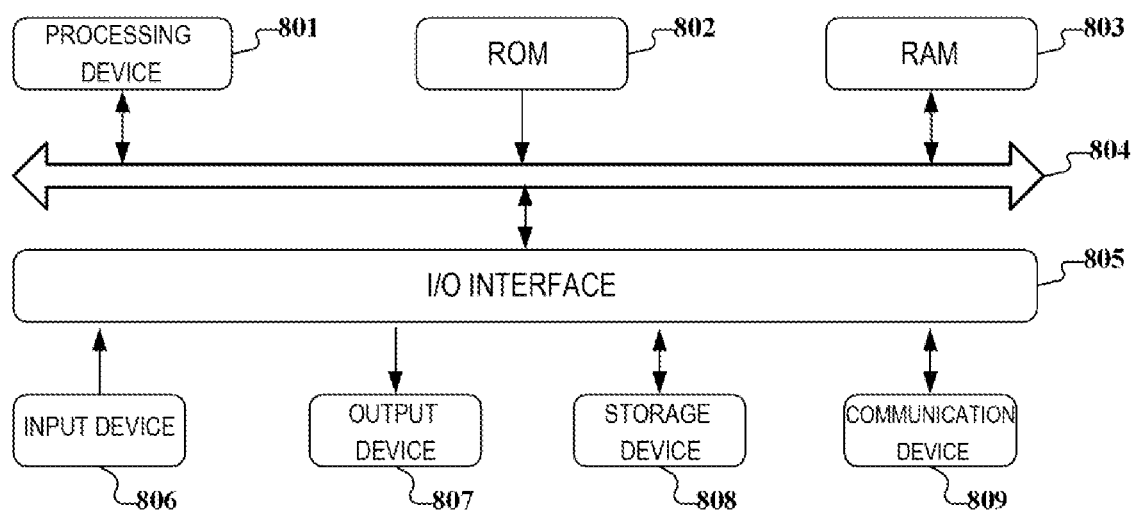
FIG. 8 illustrates a schematic diagram of the basic structure of an electronic device proposed according to embodiments of the present disclosure.

Reference is now made to FIG. 8, illustrates a schematic diagram of the basic structure of an electronic device (the terminal device or server shown in FIG. 7) proposed according to embodiments of the present disclosure. The terminal devices in this disclosed embodiment may include, but are not limited to, mobile terminals such as mobile phones, laptops, digital broadcasting receivers, personal digital assistants (PDAs), portable android devices (PADs), portable multimedia players (PMI's), terminals on broad (such as navigation terminals on broad), and fixed terminals such as digital TVs, desktop computers, and the like. The electronic device shown in FIG. 8 is only for the propose of illustration and should not suggest any limitations on the functionality and scope of use of the disclosed embodiment.

As shown in FIG. 8, the electronic device may include a processing device (e.g., a central processing unit, a graphics processor, etc.) 801 that can perform various appropriate actions and processes based on programs stored in read-only memory (ROM) 802 or loaded from the storage device 808 into random access memory (RAM) 803. In RAM 803, various programs and data required for the operation of the electronic device 800 are also stored. The processing unit 801, ROM 802, and RAM 803 are connected to each other via bus 804. The input/output (I/O) interface 805 is also connected to bus 804.

In general, the following devices can be connected to the I/O interface 805: an input device 806 including, for example, touch screen, touchpad, keyboard, mouse, camera, microphone, accelerometer, gyroscope, etc.; an output device 807 such as liquid crystal display (LCD), speakers, vibrators, etc.; a storage device 808 such as magnetic tape, hard disk, etc.; and a communication device 809. The communication device 809 may allow electronic devices to communicate wirelessly or wired with other devices to exchange data. Although FIG. 8 shows an electronic device with a variety of devices, it is to be understood that it is not required to implement or deploy all of the devices shown. More or fewer apparatuses may be implemented or possessed instead.

Specifically, according to the disclosed embodiments, the process described above with reference to the flowchart can be implemented as a computer software program. For example, the disclosed embodiment includes a computer program product that includes a computer program carried on a non transient computer-readable medium, which includes program code for executing the method shown in the flowchart. In such embodiments, the computer program can be downloaded and installed from the network through communication device 809, or installed from storage device 808, or installed from ROM 802. When the computer program is executed by the processing device 801, the above-mentioned functions defined in the method of the present disclosed embodiment are executed.

It is to be noted that the computer-readable medium mentioned in this disclosure can be a computer-readable signal medium, a computer-readable storage medium, or any combination of the two. Computer readable storage media can be, for example, but not limited to, systems, devices or devices of electricity, magnetism, light, electromagnetism, infrared, or semiconductors, or any combination of the above. More specific examples of computer-readable storage media may include, but are not limited to: electrical connections with one or more wires, portable computer disks, hard drives, random access memory (RAM), read-only memory (ROM), erasable programmable read-only memory (EPROM or flash memory), optical fibers, portable compact disk read-only memory (CD-ROM), optical storage devices, magnetic storage devices Or any suitable combination of the above. In this disclosure, a computer-readable storage medium may be any tangible medium that contains or stores a program, which can be used by or in combination with an instruction execution system, device, or device. In this disclosure, computer-readable signal media may include data signals propagated in the baseband or as part of the carrier wave, which carry computer-readable program code. This propagation of data signals can take various forms, including but not limited to electromagnetic signals, optical signals, or any suitable combination of the above. A computer-readable signal medium can also be any computer-readable medium other than a computer-readable storage medium, which can send, propagate, or transmit programs for use by or in combination with instruction execution systems, devices, or devices. The program code contained on computer readable media can be transmitted using any suitable medium, including but not limited to wires, optical cables, RF (radio frequency), etc., or any suitable combination of the above.

In some implementations, clients and servers can communicate using any currently known or future developed network protocol such as HTTP (HyperText Transfer Protocol) and can interconnect with any form or medium of digital data communication (such as communication networks). Examples of communication networks include local area networks ("LANs"), wide area networks ("WANs"), internets (such as the Internet), and end-to-end networks (such as ad hoc end-to-end networks), as well as any currently known or future developed networks.

The computer readable medium mentioned above can be included in the electronic device mentioned above; it can also exist separately without being assembled into the electronic device.

The computer readable medium carries one or more programs. When one or more programs are executed by the electronic device, cause the electronic device to in response to a hit of a data unit in a first data table to a target field in a second data table, determine whether a format reference condition is met; in response to determining that a format reference condition is met, determine a target field data item that matches the data unit; present the matched target field data item in the data unit of the first data table in a format style of the matched target field data item in the target field.

Computer program code for executing the operations disclosed herein may be written in one or more programming languages or combinations thereof, including but not limited to object-oriented programming languages such as Java, Smalltalk, C++, as well as conventional procedural programming languages such as "C" or similar programming languages. Program code can be completely executed on the user's computer, partially executed on the user's computer, executed as a standalone software package, partially executed on the user's computer, partially executed on a remote computer, or completely executed on a remote computer or server. In cases involving remote computers, the remote computer can be connected to the user's computer through any type of network, including a local area network (LAN) or wide area network (WAN), or can be connected to an external computer (such as using an Internet service provider to connect through the Internet).

The flowchart and block diagram in the attached figure illustrate the possible architecture, functions, and operations of systems, methods, and computer program products according to various embodiments of the present disclosure. At this point, each box in a flowchart or block diagram can represent a module, program segment, or part of code that contains one or more executable instructions for implementing specified logical functions. It should also be noted that in some alternative implementations, the functions indicated in the boxes can also occur in a different order than those indicated in the accompanying drawings. For example, two consecutive boxes can actually be executed in parallel, and sometimes they can also be executed in the opposite order, depending on the function involved. It should also be noted that each box in the block diagram and/or flowchart, as well as the combination of boxes in the block diagram and/or flowchart, can be implemented using dedicated hardware based systems that perform specified functions or operations, or can be implemented using a combination of dedicated hardware and computer instructions.

The units described in the present disclosed embodiment can be implemented through software or hardware. Among them, the name of the unit does not constitute a qualification for the unit itself in a certain situation, for example, the first determination unit can also be described as "the unit that determines whether the as-is presentation condition is met".

The functions described above in this article can be at least partially executed by one or more hardware logic components. For example, non-limiting examples of hardware logic components that can be used include: Field Programmable Gate Arrays (FPGAs), Application Specific Integrated Circuits (ASICs), Application Specific Standard Products (ASSPs), On Chip Systems (SOC), Complex Programmable Logic Devices (CPLDs), and so on.

In the context of this disclosure, machine readable media can be tangible media that can contain or store programs for use by or in combination with instruction execution systems, devices, or devices. A machine readable media can be machine readable signal media or machine readable storage media. A machine readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The above description is only a preferred embodiment of this disclosure and an explanation of the technical principles used. Those skilled in the art should understand that the scope of disclosure involved in the present disclosure is not limited to technical solutions formed by specific combinations of the aforementioned technical features, but also covers other technical solutions formed by any combination of the aforementioned technical features or their equivalent features without departing from the disclosed concept. For example, a technical solution formed by replacing the above features with (but not limited to) technical features with similar functions disclosed in this disclosure.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

I claim:

1. A presentation method comprising:
   in response to a hit of a data unit in a first data table to a target field in a second data table, determining whether a format reference condition is met;
   in response to determining that the format reference condition is met, determining a target field data item that matches the data unit, and storing the target field as an instance corresponding to a third field, wherein the third field is a field in the first data table to which the data unit belongs;
   presenting the matched target field data item in the data unit of the first data table in a format style of the matched target field data item in the target field;
   presenting, based on the instance, the third field and/or a derived field of the third field;
   wherein the target field is marked with a preset identifier; and
   the presenting, based on the instance, the third field and/or a derived field of the third field comprises:
   receiving a predefined function calculation instruction;
   generating a calculation result based on the function calculation instruction; and in response to determining that a field participating in generating the calculation result is marked with a preset identifier, and the calculation result includes an original value of a field marked with the preset identifier, presenting an original value in the calculation result in a format style of a field in the instance.

2. The method according to claim 1, wherein the method further comprises:
   presenting a reference pattern input control; and
   in response to receiving an as-is reference instruction input at the reference pattern input control, determining that the format reference condition is met.

3. The method according to claim 1, wherein the method further comprises:

presenting a target field selection control, and determining a target field based on the target field selection control, wherein a first selection control is used to receive a target field identifier; and presenting an associated field setting control, and establishing an association relationship between fields based on an operation of the associated field setting control, wherein the associated field setting control is used to receive a first field identifier and a second field identifier, the first field identifier indicates a field in a first data table, and the second field identifier indicates a field in a second data table.

4. The method according to claim 1, wherein in response to determining that the format reference condition is met, the determining a target field data item that matches the data unit comprises:

obtaining a first field data item from a record to which a data unit belongs, wherein there is a pre-established association between a first field of the first data table and a second field of the second data table;

searching, in the second field of the second data table, a second field data item that matches the obtained first field data item;

obtaining the target field data item from a record to which the searched second field data item belongs; and determining the obtained target field data item as a target field data item that matches the data unit.

5. The method according to claim 1, wherein the presenting the matched target field data item in the data unit of the first data table in a format style of the matched target field data item in the target field comprises:

obtaining a data item identifier of the matched target field data item, and obtaining an original value of the target field data item in a target field based on the obtained data item identifier;

determining the original value as a data item value of the data unit; and drawing a data item value indicated by the original value in the data unit.

6. The method according to claim 1, wherein the presenting, based on the instance, the third field and/or a derived field of the third field comprises:

receiving a filtering instruction;

in response to determining that a field targeted by the filtering instruction is the third field, determining a filtering result from an instance corresponding to the third field; and presenting the filtering result in a format style of a field in the instance.

7. The method according to claim 1, wherein the presenting, based on the instance, the third field and/or a derived field of the third field comprises:

receiving a drawing instruction;

in response to determining that a field targeted by the drawing instruction is the third field, obtaining a data item value from an instance corresponding to the third field; and drawing and presenting the data item value in a format style of a field in the instance.

8. A device comprising:
one or more processors; and
a storage apparatus storing one or more programs, the one or more programs, when executed by the one or more processors, cause the one or more processors to perform a method comprising:

in response to a hit of a data unit in a first data table to a target field in a second data table, determining whether a format reference condition is met;

in response to determining that the format reference condition is met, determining a target field data item that matches the data unit, and storing the target field as an instance corresponding to a third field, wherein the third field is a field in the first data table to which the data unit belongs;

presenting the matched target field data item in the data unit of the first data table in a format style of the matched target field data item in the target field;

presenting, based on the instance, the third field and/or a derived field of the third field;

wherein the target field is marked with a preset identifier; and wherein the presenting, based on the instance, the third field and/or a derived field of the third field comprises:

receiving a predefined function calculation instruction;

generating a calculation result based on the function calculation instruction; and in response to determining that a field participating in generating the calculation result is marked with a preset identifier, and the calculation result includes an original value of a field marked with the preset identifier, presenting an original value in the calculation result in a format style of a field in the instance.

9. The device of claim 8, wherein the method further comprises:

presenting a reference pattern input control; and in response to receiving an as-is reference instruction input at the reference pattern input control, determining that the format reference condition is met.

10. The device of claim 8, wherein the method further comprises:

presenting a target field selection control, and determining a target field based on the target field selection control, wherein a first selection control is used to receive a target field identifier; and presenting an associated field setting control, and establishing an association relationship between fields based on an operation of the associated field setting control, wherein the associated field setting control is used to receive a first field identifier and a second field identifier, the first field identifier indicates a field in a first data table, and the second field identifier indicates a field in a second data table.

11. The device of claim 8, wherein in response to determining that the format reference condition is met, the determining a target field data item that matches the data unit comprises:

obtaining a first field data item from a record to which a data unit belongs, wherein there is a pre-established association between a first field of the first data table and a second field of the second data table;

searching, in the second field of the second data table, a second field data item that matches the obtained first field data item;

obtaining the target field data item from a record to which the searched second field data item belongs; and determining the obtained target field data item as a target field data item that matches the data unit.

12. The device of claim 8, wherein the presenting the matched target field data item in the data unit of the first data table in a format style of the matched target field data item in the target field comprises:

obtaining a data item identifier of the matched target field data item, and obtaining an original value of the target field data item in a target field based on the obtained data item identifier;

determining the original value as a data item value of the data unit; and drawing a data item value indicated by the original value in the data unit.

13. The device of claim 8, wherein the presenting, based on the instance, the third field and/or a derived field of the third field comprises:

receiving a filtering instruction;

in response to determining that a field targeted by the filtering instruction is the third field, determining a filtering result from an instance corresponding to the third field; and presenting the filtering result in a format style of a field in the instance.

14. The device of claim 8, wherein the presenting, based on the instance, the third field and/or a derived field of the third field comprises:

receiving a drawing instruction;

in response to determining that a field targeted by the drawing instruction is the third field, obtaining a data item value from an instance corresponding to the third field; and drawing and presenting the data item value in a format style of a field in the instance.

15. A non-transitory computer-readable storage medium storing instructions which, when executed by a processor, cause the processor to perform a method comprising:

in response to a hit of a data unit in a first data table to a target field in a second data table, determining whether a format reference condition is met;

in response to determining that the format reference condition is met, determining a target field data item that matches the data unit, and storing the target field as an instance corresponding to a third field, wherein the third field is a field in the first data table to which the data unit belongs;

presenting the matched target field data item in the data unit of the first data table in a format style of the matched target field data item in the target field;

presenting, based on the instance, the third field and/or a derived field of the third field;

wherein the target field is marked with a preset identifier; and the presenting, based on the instance, the third field and/or a derived field of the third field comprises:

receiving a predefined function calculation instruction;

generating a calculation result based on the function calculation instruction; and in response to determining that a field participating in generating the calculation result is marked with a preset identifier, and the calculation result includes an original value of a field marked with the preset identifier, presenting an original value in the calculation result in a format style of a field in the instance.

* * * * *